United States Patent

Meyer

[11] Patent Number: 5,569,313
[45] Date of Patent: Oct. 29, 1996

[54] MOULD MECHANISM

[75] Inventor: Willi Meyer, Effretikon, Switzerland

[73] Assignee: Emhart Glass Machinery Investments Inc., Wilmington, Del.

[21] Appl. No.: 401,399

[22] Filed: Mar. 9, 1995

[30] Foreign Application Priority Data

Mar. 9, 1994 [GB] United Kingdom .................. 9404488

[51] Int. Cl.$^6$ ........................................... C03B 9/353
[52] U.S. Cl. ................... 65/359; 65/357; 65/361
[58] Field of Search .......................... 65/357, 358, 359, 65/360, 361, 216, 215, 214, 356; 425/349, 356, 359

[56] References Cited

U.S. PATENT DOCUMENTS

| | | | |
|---|---|---|---|
| 3,251,673 | 5/1966 | Brymer, Jr. | 65/359 |
| 3,617,233 | 11/1971 | Mumford | 65/359 |
| 4,009,018 | 2/1977 | Nebelung et al. | 65/229 |
| 4,070,174 | 1/1978 | Nebelung et al. | 65/229 |
| 4,585,469 | 4/1986 | Nebelung | 65/359 |
| 4,832,727 | 5/1989 | Libert | 65/357 |
| 5,252,114 | 10/1993 | Sidler | 65/229 |

FOREIGN PATENT DOCUMENTS 0153534  4/1985  European Pat. Off. .......... C03B 9/38

Primary Examiner—Jill Warden
Assistant Examiner—Alexander Markoff
Attorney, Agent, or Firm—Spencer T. Smith

[57] ABSTRACT

A mold mechanism for use in a glassware forming machine comprises two mold arms which are mounted on a single transverse rod. The rod is of hardened steel, one of the mold arms is secured to a cast iron sleeve which slides on the rod, the other to a hardened steel sleeve which slides on the cast iron sleeve. A slide member on each mold arm engages a horizontal slideway and is adjustable to determine the position of the mold arms.

2 Claims, 4 Drawing Sheets

MOULD MECHANISM

This invention is concerned with mould mechanisms for use in glassware forming machines.

BACKGROUND TO THE INVENTION

A common type of glassware forming machine is the so called individual section or I.S. machine which comprises a bank of separate sections which are caused to operate in staggered time relationship one with another so that each section in turn produces glassware. I.S. machines comprising 10, 12 or even more sections are now common place.

A section of an I.S. machine normally comprises two sets of moulds, each set comprising one, two three or four pairs of mould halves, one set being adapted for forming parisons from gobs of molten glass delivered to the machine, the other set being adapted for forming blown containers from the parison. The mechanisms for moving these mould halves between open and closed conditions may either move them about a vertical pivot point, thus moving the mould halves arcuately, or may move them with parallel motion. In many ways a parallel movement of the mould halves is preferable—it is easy to provide for consistent conditions in the mould halves. However parallel mould mechanisms are generally more expensive than arcuate mould mechanism, in particular because of the need to ensure the necessary rigidity of the system.

In U.S. Pat. No. 4,009,018 a parallel mould mechanism is described. This mechanism comprises two mould arms each comprising one or more supports for a mould half and three transverse rods mounted in a frame member. Each mould arm is mounted for sliding movement on two of these mould members, having a long sleeve slidably mounted on one transverse rod (thus to give transverse rigidity to the mould arm, and a short sleeve slidably mounted on another transverse rod, which rod also has a short sleeve forming part of the other mould arm slidably mounted on it. The combination of two sleeves mounted on the two rods determines the vertical position of the mould arm. Not only is this construction expensive to manufacture, but the parts require to be manufactured to very close tolerances to ensure that the vertical positions of the mould arms are correct as effectively no adjustment of these positions can be effected.

It is one of the objects of the present invention to provide a parallel mould mechanism of a cheaper and more convenient construction.

BRIEF STATEMENT OF THE INVENTION

The present invention provides a mould mechanism for use in a glassware forming machine comprising a frame member a transverse rod mounted in the frame member two mould arms each comprising one or more supports for a mould half, and each comprising an end portion mounted for sliding movement on said transverse rod so that the mould arms can move towards and away from each other between open and closed positions linkage means for moving the mould arms between their open and their closed positions wherein the transverse rod is made of hardened steel a first one of the mould arms has secured to it a cast iron sleeve which slides on the transverse rod and the second one of the mould arms has secured to it a hardened steel sleeve which slides on the cast iron sleeve.

Preferably a mould mechanism according to the invention comprises a transverse slideway fixed to the frame member and a slide member secured to each mould arm and engaged with the slideway and adjustable to determine the position of each mould arm with respect to the frame member.

The invention will now be made more clear from the following description, to be read with reference to the accompanying drawings, of a mould mechanism embodying the invention.

In the accompanying drawings

DESCRIPTION OF THE PREFERRED EMBODIMENT

Figure 1:
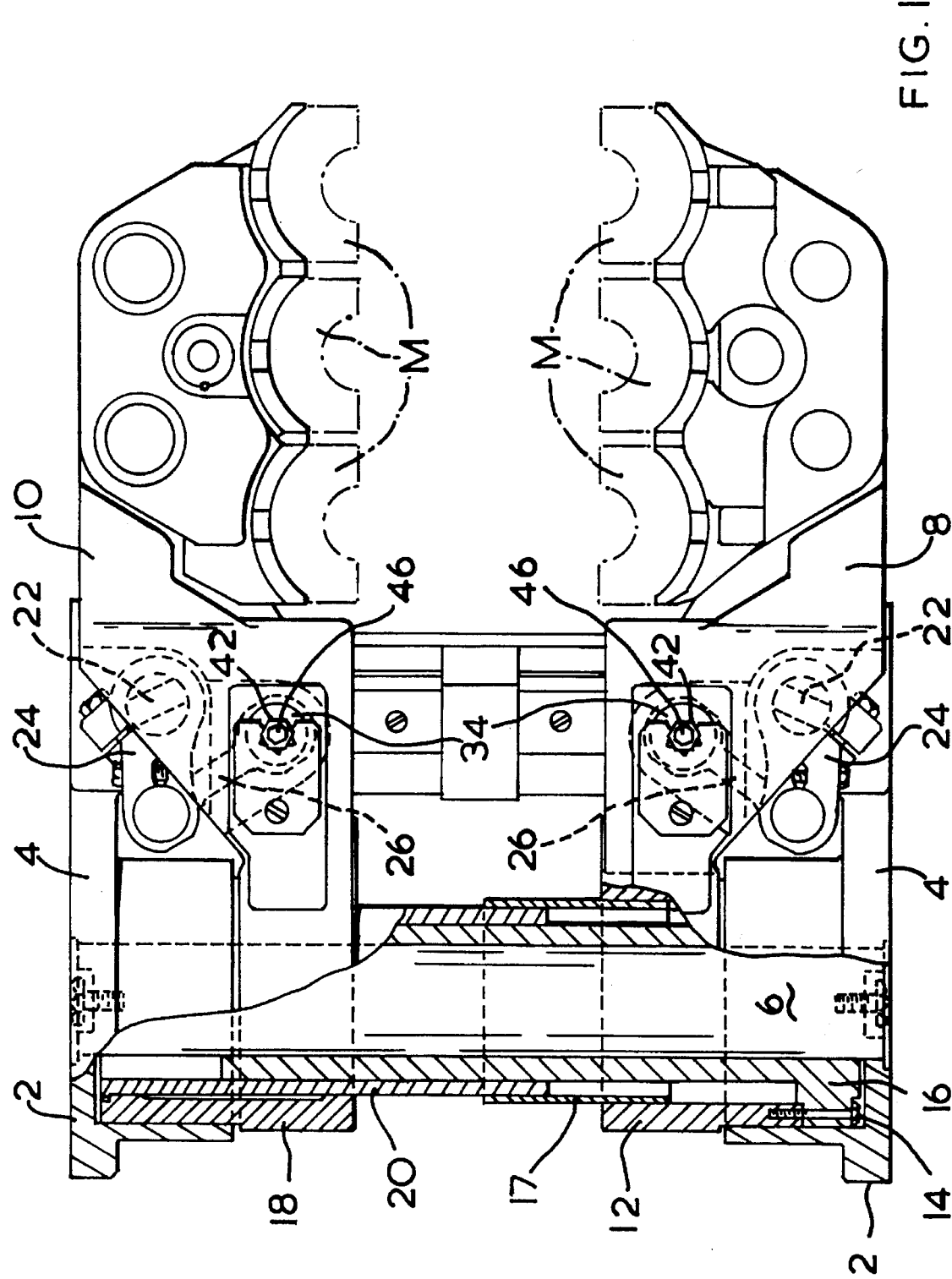
FIG. 1 shows a plan view of the mould mechanism in its open condition.

The drawings show a mould mechanism for use forming parisons in a glassware forming machine comprising a frame member 2 which is secured to a top plate (not shown) of a frame of the machine. The frame member 2 comprises two upwardly extending opposed trunnions 4 in which is secured a transverse hardened steel rod 6.

Two mould arms 8, 10 each comprising one or more (specifically three) supports for a mould half M are mounted for sliding movement on the rod 6. Mould arm 8 comprises an end portion 12 which surrounds the rod 6 and to which is secured by bolts 14 to a cast iron sleeve 16 which slides on the rod 6. Mould member 10 comprises an end portion 18 into which is pressed a hardened sleeve 20 which slides on the sleeve 16. Slidably in the end portion 12 of the mould arm 8 is a cover sleeve 17 which serves to protect the outer surface of the sleeve 16 from dirt.

Each of the mould arms 8 and 10 is connected by linkage means to an operating mechanism which is generally similar to that described in U.S. Pat. No. 4,009,018. The operating mechanism for each of the arms 8 and 10 comprises a vertical shaft 22 mounted in the frame of the machine and which can be rotated by mechanism not shown, and which has secured to an upper end portion a lever 24. Pivotally mounted on the lever 24 is a link 26 which is pivoted to the mould arm 8, 10 by a sleeve 34. An end portion 25 of the link 26 surrounds a bearing sleeve 27 which surrounds the sleeve 34. A washer 29 positioned on the sleeve 34 lies between the end portion 25 and the sleeve 27 and an upper end face 31 of a cavity 33 in the mould arms 8, 10.

Figure 2:
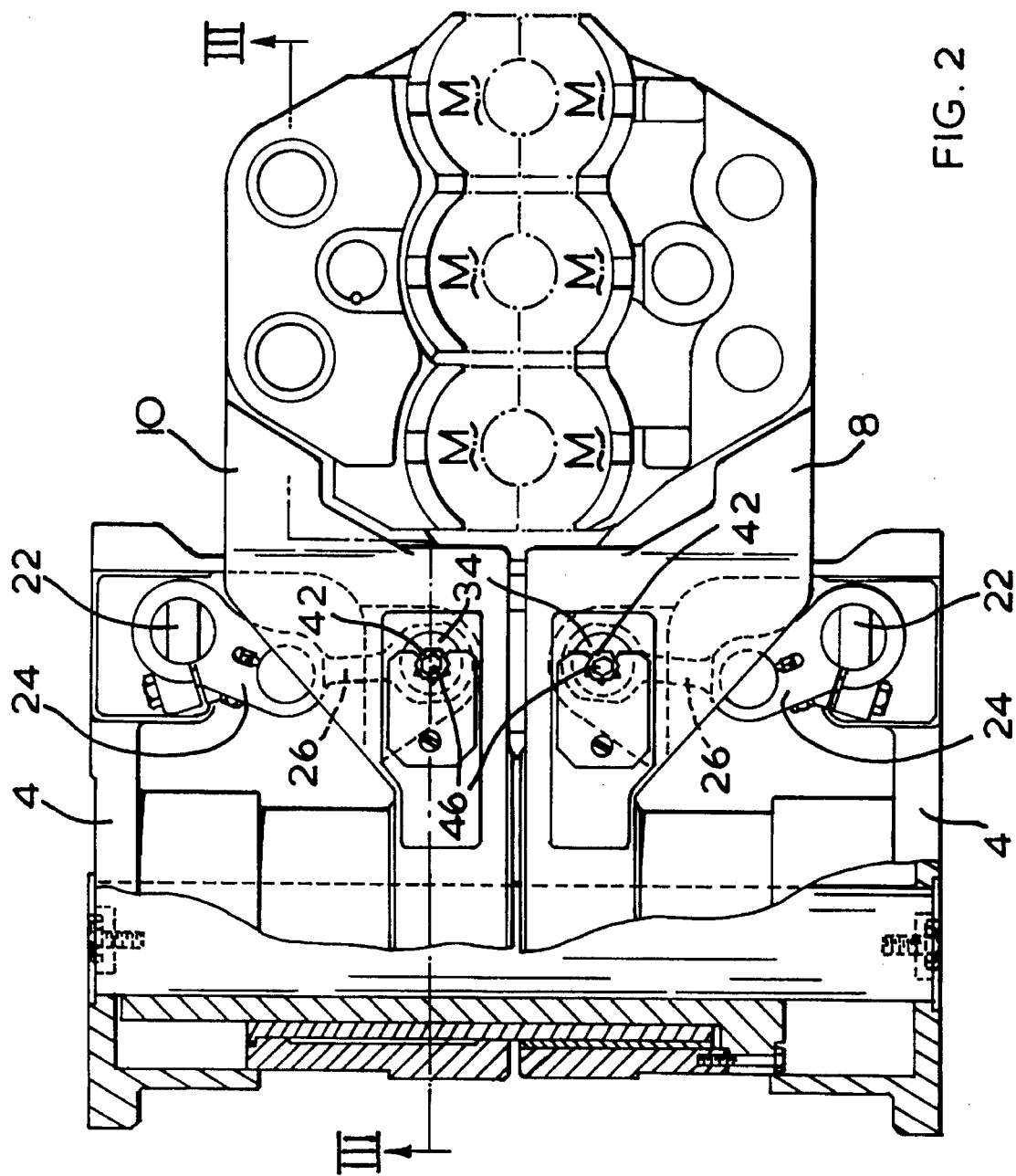
FIG. 2 shows a corresponding plan view of the mould mechanism in its closed condition.

It can be seen that rotation of the shaft 22 by about 70° moves the mould arms 8 and 10 from the position shown in FIG. 1 to the position shown in FIG. 2 that is to say between an open and closed condition.

Each mould arm 8, 10 comprises a locating member which determines the angular position of the mould arm in relation to the rod 6; the locating member of the arm 10 will now be described with reference to FIGS. 3 and 4.

Secured to an upper face of the frame member 2 by bolts 28 is a T shaped slide way 30 which extends transversely of the frame member 2. Screwed into a bore 32 in the arm 10 is a sleeve 34. The sleeve 34 has an axial bore 36 comprising an enlarged end portion 38: An end face 40 of the sleeve 34 is chamfered. The sleeve 34 comprises, towards its upper end, a hexagonal head 42.

Positioned in the bore 36 of the sleeve 34 is a bolt 44 having a head 46 and a screw threaded shank 48. A slide member 50 is secured to the shank 48 and comprises a boss 52 with a threaded bore, a horizontal portion 54, two downwardly extending side portions 56 and two inwardly extending lands 58. The slide member 50 is thus generally C shaped in cross section and surrounds the bar of the T shaped slide 30, the horizontal portion 54 extending across the upper face of the slide 30 and the lands 58 extending under the bar of the T shaped slide 30.

The mould mechanism comprises customary means for lubricating the various moving parts of the mechanism, only some of which are shown. A lubrication pipe 37 leads to a lubrication passage 39 formed in the arm 10 which comprises a horizontal portion 41 which opens into the bore 32. The sleeve 34 is provided with an annular recess 43 which is positioned opposite the portion 41 and radial holes 45 lead from the recess 43 to the bore 36 of the sleeve 34. Formed in an upper surface of the horizontal portion 54 of the slide member 50 is an inclined recess 60 against which the chamfered end face 40 of the sleeve 34 rests. Oil to lubricate the slide member 50 passes down the bore 36 into this recess 60.

A locking plate 62 secured to the arm 10 by a screw 64 serves to lock the head 42 in position.

It can be seen that by releasing the locking plate 60 and rotating the head 42 of the sleeve 34, the sleeve can be caused to move up and down in the arm 10. The slideway 30 is fixed to the frame member 2, and thus this movement of the sleeve causes pivotal movement of the mould arm 2 about the rod 6, thus to enable fine adjustment of the position of the mould arm 10 into its correct horizontal position.

A strictly similar arrangement is provided for the mould arm 8—it will be understood that, on opening and closing movement of the mould arms the slide member 50 slides along the slideway 30.

Each mould arm 8, 10 is provided with means for supplying cooling air to the mould halves supported by the mould arms.

Figure 3:
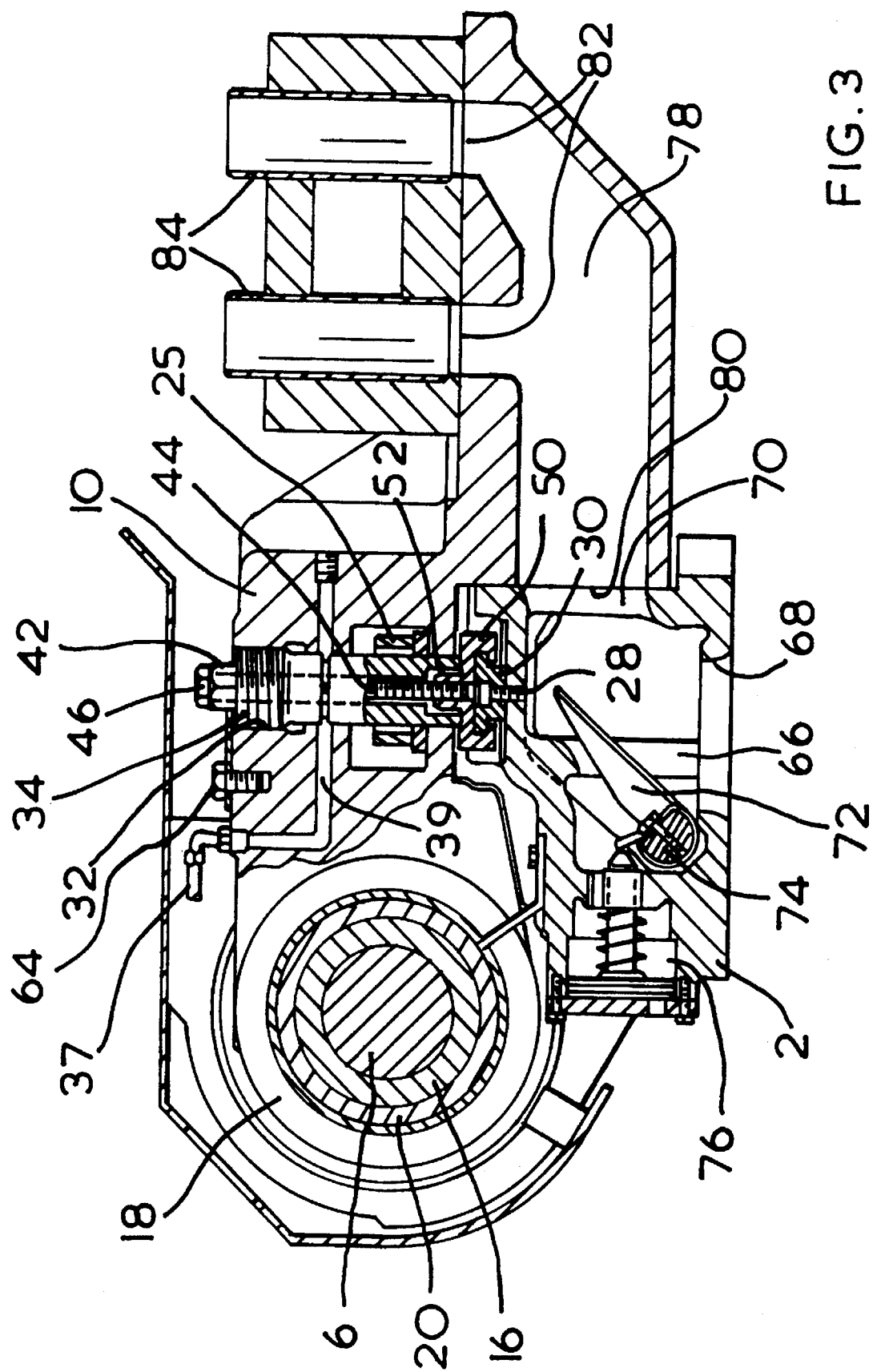
FIG. 3 is a view in section along the line III—III in FIG. 2.
Figure 4:
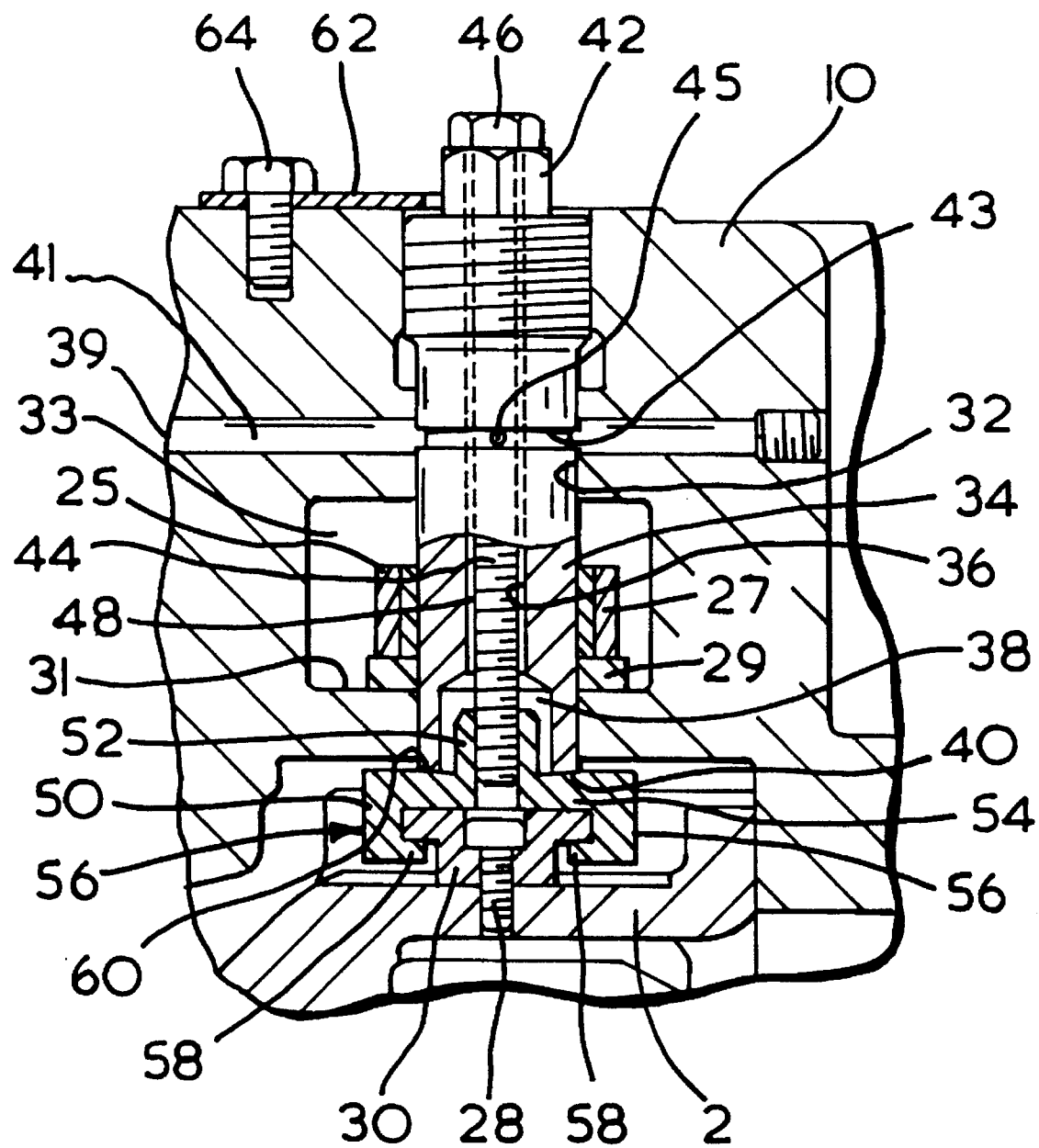
FIG. 4 is an enlarged view of a portion of FIG. 3.

With reference to FIG. 3, the frame member 2 is provided with a chamber 66 which has a horizontal downwardly facing entry opening 68 and a vertical forward exit opening 70. Mounted in the frame member 2 is a flap valve member 72 which is pivoted on a shaft 74, and can be caused to move into position to close the entry opening 68 by a pneumatic piston and cylinder device 76. The mould arm 10 comprises a chamber 78 having a vertical rearward entry 80 and two exits 82. The exits 82 communicate with conduits 84 which when the mould mechanism is in use are connected to a plenum chamber, part of a cooling arrangement for each of the moulds, which arrangement is conveniently generally similar to that described in EP 153534.

Supply of air to the piston and cylinder device is controlled by a solenoid operated valve (not shown) and the flap valve member 72 is thus caused to open and close at the desired times. When the mould arm 10 is in its closed position the entry 80 in the mould arm is in full register with the exit opening 70 of the chamber 66: it is when the moulds are closed that mould cooling is normally performed. However, even when the mould arm 10 is in its open position, there is an overlap between the entry 80 and the exit opening 70 so that mould cooling air may be supplied if desired.

When air is supplied to piston and cylinder device 76 the flap valve member 72 is closed and no cooling air is supplied to the moulds. When the supply of air to the piston and cylinder device 76 is stopped, the pressure of cooling air in the frame of the machine opens the flap valve member 72 and air is supplied through the chamber 66 and 78 to the conduits 84 and thence to the moulds to cool them.

The mounting of the mould member on the arms 8 and 10 is not described as it is conventional, incorporating means for balancing pressures between the mould halves when the arms 8, 10 are moved into their closed condition.

The mould mechanism as just described, apart from being generally cheaper to manufacture than other proposed parallel mould mechanism, has some other advantages. Because of the accurate angular location provided by the slide members 50 and the slideway 30, the mould arms 8 and 10 are supported against vertical deflection. At the same time, if it is wished to gain access to the mould mechanism, release of the slide members 50 will allow the mould arm to be pivoted about the rod 6 when repair or adjustment is required.

I claim:

1. A mold mechanism for an I.S. Machine comprising a pair of mold assemblies, means for supporting said pair of mold assemblies for linear displacement between a retracted open position and an advanced closed position including a support including a hardened steel rod, a first mold arm for supporting one of said pair of mold assemblies, said first mold arm including a cast iron sleeve having an elongated bore for matingly receiving said hardened steel rod and an elongated outer cylindrical surface, a second mold arm supporting the other of said pair of mold assemblies, said second mold arm including a hardened steel sleeve having an elongated bore for matingly receiving the elongated outer cylindrical surface of said cast iron sleeve, and means for displacing said supported pair of mold assemblies between said retracted and advanced positions.

2. A mold mechanism according to claim 1, wherein said supporting means further comprises a slide way, and slide means on each of said first and second mold arms for cooperation with said slide way.

\* \* \* \* \*